(12) United States Patent
Yamamoto et al.

(10) Patent No.: US 7,286,159 B2
(45) Date of Patent: Oct. 23, 2007

(54) BALL MOTION MEASURING APPARATUS

(75) Inventors: Akio Yamamoto, Kobe (JP); Hideaki Kawamatsu, Kobe (JP)

(73) Assignee: SRI Sports Limited, Kobe (JP)

( * ) Notice: Subject to any disclaimer, the term of this patent is extended or adjusted under 35 U.S.C. 154(b) by 93 days.

(21) Appl. No.: 09/986,114

(22) Filed: Nov. 7, 2001

(65) Prior Publication Data
US 2002/0085213 A1    Jul. 4, 2002

(30) Foreign Application Priority Data
Nov. 8, 2000    (JP) ............................. 2000-339896

(51) Int. Cl.
  *H04N 7/18*    (2006.01)
(52) U.S. Cl. .................................... 348/157
(58) Field of Classification Search ................ 348/241, 348/240, 358, 347, 207, 138, 357, 157, 135, 348/700, 169, 153, 155, 369, 580, 582, 583, 348/143, 152, 154, 345, 333, 151, 231, 360, 348/578, 222; 473/407, 409, 199, 152, 223, 473/156; 382/289, 107, 154, 100, 286, 293, 382/296, 297, 106
See application file for complete search history.

(56) References Cited

U.S. PATENT DOCUMENTS

| | | | | |
|---|---|---|---|---|
| 4,158,853 A | * | 6/1979 | Sullivan et al. | ............. 348/157 |
| 5,469,175 A | * | 11/1995 | Boman | ................... 342/357.08 |
| 5,489,099 A | * | 2/1996 | Rankin et al. | ............... 473/199 |
| 5,873,797 A | * | 2/1999 | Garn | ........................... 473/407 |
| 5,905,530 A | * | 5/1999 | Yokota et al. | ......... 348/240.99 |
| 5,938,545 A | * | 8/1999 | Cooper et al. | ............... 473/407 |
| 5,943,450 A | * | 8/1999 | Hwang | ........................ 382/298 |
| 6,204,876 B1 | * | 3/2001 | Uomori et al. | ............... 348/47 |
| 6,226,416 B1 | * | 5/2001 | Ohshima et al. | ............ 382/289 |
| 6,320,173 B1 | * | 11/2001 | Vock et al. | .............. 250/206.1 |
| 6,458,035 B1 | * | 10/2002 | Katayama | .................... 473/199 |
| 2002/0041339 A1 | * | 4/2002 | Diepold | ....................... 348/700 |
| 2002/0041383 A1 | * | 4/2002 | Lewis et al. | .................. 358/1.9 |
| 2002/0054211 A1 | * | 5/2002 | Edelson et al. | ............. 348/169 |

FOREIGN PATENT DOCUMENTS

JP    A10-186474    7/1998

* cited by examiner

*Primary Examiner*—Tung Vo
*Assistant Examiner*—Behrooz Senfi
(74) *Attorney, Agent, or Firm*—Birch, Stewart, Kolasch and Birch, LLP

(57) ABSTRACT

A ball motion measuring apparatus comprises a tee 3 for mounting a golf ball 1 thereon, a first camera 5, a second camera 7, a pair of first stroboscopes 9, a pair of second stroboscopes 11, a pair of optical sensors 13, a CPU 15 to be a calculating section, and a monitor 17 to be a display section. The first camera 5 and the second camera 7 are CCD cameras having a shutter function. Photographing is carried out by means of the first camera 5 after a predetermined time passes since the golf ball 1 is hit, and the photographing is carried out by means of the second camera 7 after a predetermined time further passes. A magnified image is formed by original image data thus obtained and a read value obtained by pointing the magnified image is subjected to distortion correction or oblique correction so that correction data are obtained. Based on the correction data, a flight speed, a spin rate or a launch angle of the golf ball 1 is calculated.

8 Claims, 5 Drawing Sheets

(a)

25

(b)

25

27

BALL MOTION MEASURING APPARATUS

BACKGROUND OF THE INVENTION

1. Field of the Invention

The present invention relates to a motion measuring apparatus for a ball such as a golf ball or a tennis ball. More particularly, the present invention relates to an apparatus for measuring the motion of a ball by utilizing image data obtained by a CCD camera.

2. Description of the Related Art

When a golf ball is hit with a golf club, it flies with a so-called backspin. The backspin is a rotation setting a horizontal direction orthogonal to a hitting direction (which will be hereinafter referred to as a "z direction") to be an axis. A lift acts on the golf ball through the backspin, thereby increasing a flight distance of the golf ball. In some cases, the golf ball flies with a so-called sidespin. The sidespin is a rotation setting a vertical direction (which will be hereinafter referred to as a "y direction") to be an axis. The golf ball turns left (a draw ball for a right-handed golf player) or turns right (a fade ball for the right-handed golf player) due to the sidespin. Furthermore, the golf ball sometimes flies with a rotation setting a horizontal direction identical to the hitting direction (which will be hereinafter referred to as an "x direction") to be an axis.

A direction of the spin and a rotating speed greatly influence the subsequent trajectory of the golf ball. Similarly, the flight direction and flight speed of the golf ball greatly influence the subsequent trajectory. The measurement of the spin, the flight direction and the flight speed is effective for diagnosing the swing form of a golf player. Moreover, the measurement is also effective for the evaluation of a golf ball and a golf club. In a stage in which the golf ball and the golf club are developed, the measurement is inevitable.

Japanese Unexamined Patent Publication No. Hei 3-210282 (1991/210282) has disclosed an apparatus for photographing a flying sphere twice by means of a camera and measuring the flight speed of the sphere based on two images thus obtained. In the apparatus, the moving distance of the sphere is obtained from the two images and is divided by a photographing time interval so that the flight speed is calculated.

Japanese Patent No. 2810320 has disclosed a measuring method for photographing a flying golf ball twice at a predetermined time interval and calculating a spin rate from two images thus obtained. In the measuring method, a recognition mark put on the surface of the golf ball is read from first and second images and a rotating angle from the first image to the second image is obtained based thereon. The spin rate is calculated by the rotating angle and the photographing time interval.

Japanese Unexamined Patent Publication No. Hei 10-186474 (1998/186474) has disclosed a measuring method for photographing a flying sphere by means of two cameras in a shifted timing and calculating a spin rate, a flight speed and a flight direction from two images thus obtained.

In the case in which the flying golf ball is to be photographed by means of a camera, it is necessary to predict the position of the golf ball when a predetermined time passes after hitting and to determine the position of the camera such that the same position is included within a visual field. The head speed of a golf club is greatly varied depending on a golf player. Moreover, there are various golf clubs from a driver (W1) to a wedge. A head speed and a launch angle are greatly varied depending on the type of the golf club. Accordingly, the position of the golf ball after a predetermined time passes since hitting is considerably changed for each golf player or each used club. Therefore, it is not easy to predict the position of the golf ball after the predetermined time passes since the hitting. Even if the prediction can be carried out, a work for often changing the position of the camera is complicated.

By using a camera having a wide-angle lens (that is, a camera having a great angle of view), the visual field range is increased. Also in the case in which a hitting golf player take turns or a golf club to be used is changed, therefore, it is not necessary to often change the position of the camera.

However, a ball in an image obtained by the camera having a great angle of view is reduced. Accordingly, in the case in which an operator specifies a predetermined point of the ball image through an input pen or the like to measure a spin rate, there is a problem in that precision in the pointing is deteriorated. Moreover, the image obtained by the camera having a great angle of view has a considerable distortion in a peripheral portion (a portion having a great distance from the center of the image). Therefore, true coordinates are considerably shifted from apparent coordinates on the image so that the precision in a measured value becomes insufficient in some cases. In many cases, furthermore, the ball is not positioned on the center of the image in the photographing using the camera having a great angle of view. For this reason, the front part of the ball cannot be photographed but the ball is photographed in an oblique direction. Thus, the true coordinates are considerably shifted from apparent coordinates on the image so that precision in the measured value becomes insufficient.

SUMMARY OF THE INVENTION

In consideration of such problems, it is an object of the present invention to provide an apparatus for measuring the motion of a ball with high precision.

In order to achieve the object, the present invention provides a ball motion measuring apparatus comprising:

a CCD camera for photographing a flying ball to obtain original image data;

a calculating section for carrying out a magnifying process over a part including a ball image in an original image, thereby calculating magnified image data; and a display section for displaying a magnified image based on the magnified image data.

In the ball motion measuring apparatus, only a portion including the ball image in the original image is magnified and displayed on the display section. Accordingly, in the case in which an operator is to specify the predetermined point of the ball image, precision in pointing is high. Consequently, a measured value (such as a spin rate, a flight speed or a flight direction) can be obtained with high precision. This process will be hereinafter referred to as a "magnifying process".

In order to achieve the object, moreover, another invention provides a ball motion measuring apparatus comprising:

a CCD camera for photographing a flying ball to obtain original image data; and a calculating section for correcting a coordinate error made by a distortion of an original image which is caused by a lens of the CCD camera, thereby calculating correction data.

In the ball motion measuring apparatus, the shift of apparent coordinates on the original image from true coordinates is corrected. More specifically, correction data are obtained by modifying the distortion in the peripheral portion of the original image which is caused by the lens. Accordingly, the ball motion can be measured with high precision. The correction will be hereinafter referred to as "distortion correction".

It is preferable that the coordinate error should be corrected based on a correction ratio determined by a distance from a center of the original image. Consequently, the precision in measurement can further be enhanced.

In order to achieve the object, moreover, a further invention provides a ball motion measuring apparatus comprising:

a CCD camera for photographing a flying ball to obtain original image data; and a calculating section for correcting a coordinate error made by a shift of a direction of a ball image from a direction of an optical axis of the CCD camera, thereby calculating correction data.

Also in the ball motion measuring apparatus, the shift of the apparent coordinates on the original image from the true coordinates is corrected. Accordingly, the ball motion can be measured with high precision. More specifically, the data obtained from the original image can be converted into data obtained by photographing the front part of the ball at infinity. The correction will be hereinafter referred to as "oblique correction".

The process or correction is particularly effective for measurement to be carried out by means of a camera having a horizontal view angle of 10 degrees or more by using a wide-angle lens. As a matter of course, also in the case in which a standard lens or a telephoto lens is used, an enhancement in the precision can be obtained. The "horizontal view angle of 10 degrees" implies that a photographic range in a horizontal direction is ±5 degrees to a forward direction.

The present invention will be described below in detail based on a preferred embodiment with reference to the drawings.

DESCRIPTION OF THE PREFERRED EMBODIMENTS

Figure 1:
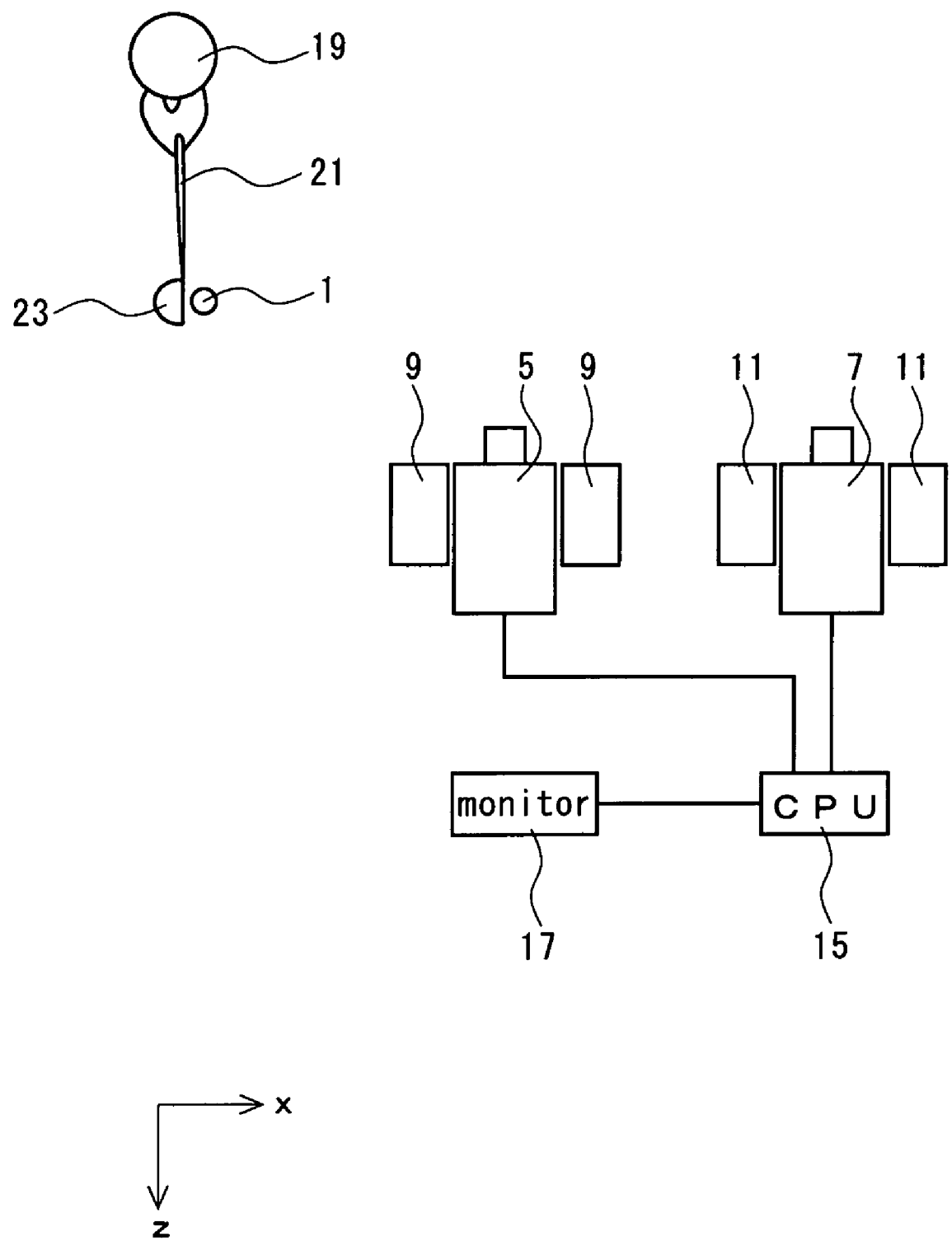
FIG. 1 is a plan view showing a ball motion measuring apparatus according to an embodiment of the present invention.
Figure 2:
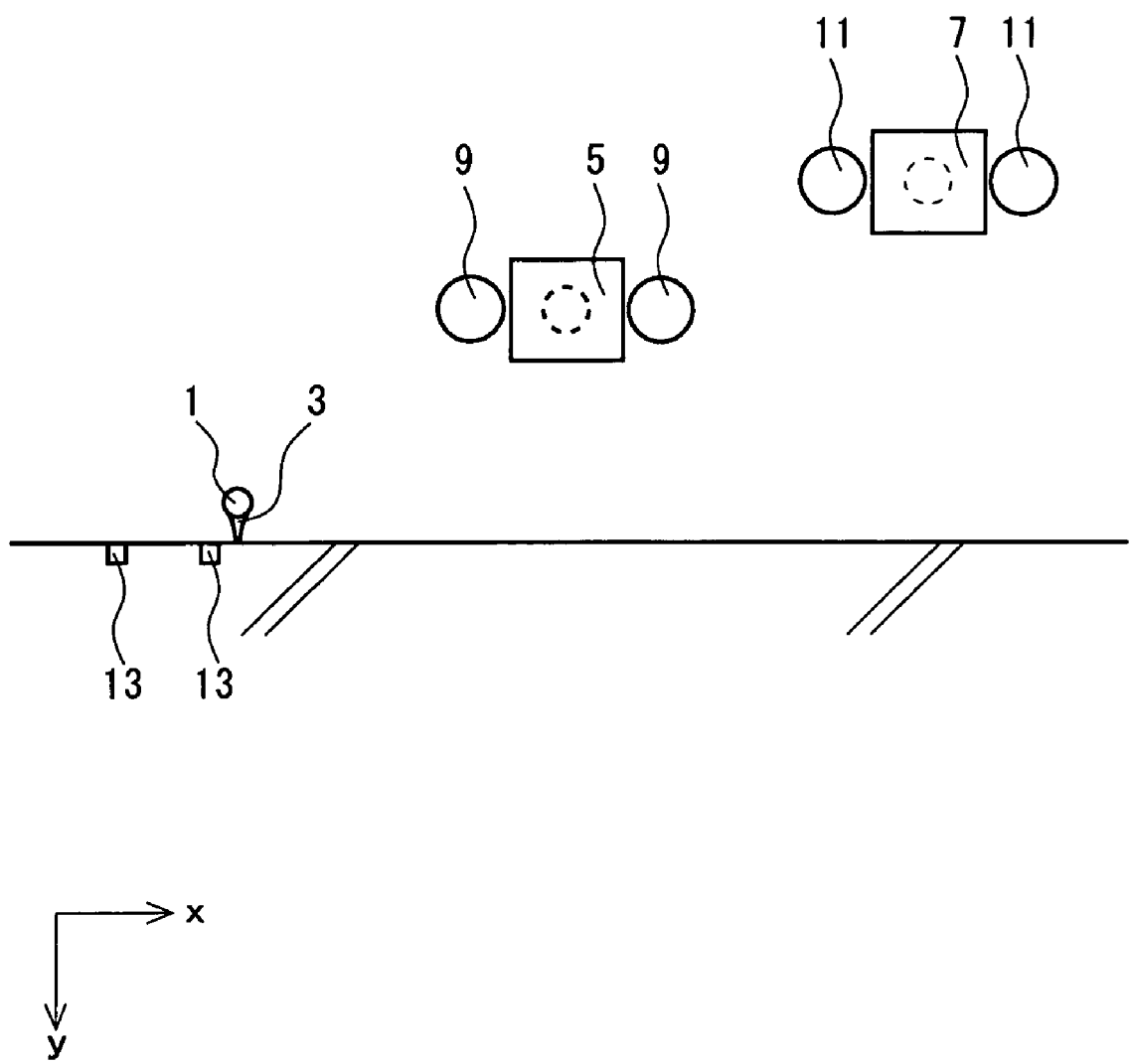
FIG. 2 is a front view showing the ball motion measuring apparatus in FIG. 1.

A ball motion measuring apparatus shown in FIGS. 1 and 2 serves to measure the motion (a spin rate, a flight speed, a launch angle and the like) of a golf ball. The ball motion measuring apparatus comprises a tee 3 for mounting a golf ball 1 thereon, a first camera 5, a second camera 7, a pair of first stroboscopes 9, a pair of second stroboscopes 11, a pair of optical sensors 13, a CPU 15 to be a calculating section, and a monitor 17 to be a display section. The first camera 5 and the second camera 7 are CCD cameras having a shutter function. The CCD camera comprises a wide-angle lens and has a wide photographic range (a horizontal view angle of 10 degrees or more). Usually, a camera having a horizontal view angle of 150 degrees or less is used. The shutters of the first camera 5 and the second camera 7 are opened or closed by a control section (not shown) receiving a trigger signal which will be described below.

When the motion of the golf ball 1 is to be measured by the ball motion measuring apparatus, the golf ball 1 is first mounted on the tee 3 and a golf player 19 swings a golf club 21. Consequently, a head 23 passes through a portion just above the optical sensor 13. A head speed can be calculated from a deviation of the times at which the head 23 passes through the portions just above the two optical sensors 13 and 13. By the passage of the head 23, the trigger signal is generated from the optical sensor 13.

Then, the head 23 collides with the golf ball 1. The golf ball 1 is launched in an obliquely upper right direction in FIG. 2. After a predetermined time passes since the optical sensor 13 generates the trigger signal, the shutter of the first camera 5 is opened. Moreover, the first stroboscope 9 emits light synchronously with the opening operation of the shutter. Consequently, an original image is photographed by means of the first camera 5. After a predetermined time further passes since the first camera 5 carries out the photographic operation, the shutter of the second camera 7 is opened. Moreover, the second stroboscope 11 emits light synchronously with the opening operation of the shutter. Consequently, an original image is also photographed by means of the second camera 7. Both of the original images are static images. Data on the respective original images are sent to the CPU 15. The CPU 15 carries out a process which will be described below in detail.

The positions of the first camera 5 and the second camera 7 are determined such that the flying golf ball 1 can be photographed. The positions of the cameras 5 and 7 are usually determined such that the golf ball 1 can be photographed in almost the central part of the original image when the golf player 19 having a average head speed swings the average golf club 21. Consequently, the angles of view of the cameras 5 and 7 are increased, and furthermore, the golf ball 1 can be photographed on almost all original images even if the golf player 19 takes turns or the golf club 21 is changed. The ball motion measuring apparatus may be constituted such that a sound sensor for detecting a hitting sound is provided to generate a trigger signal.

Figure 3:
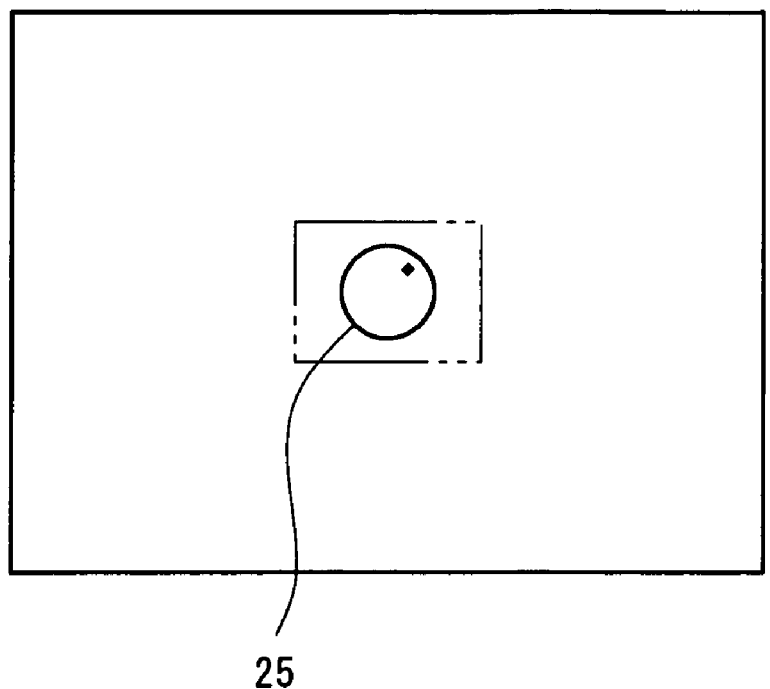
FIG. 3(a) is a front view showing an original image.
FIG. 3(b) is a front view showing a corrected image.
Figure 3:
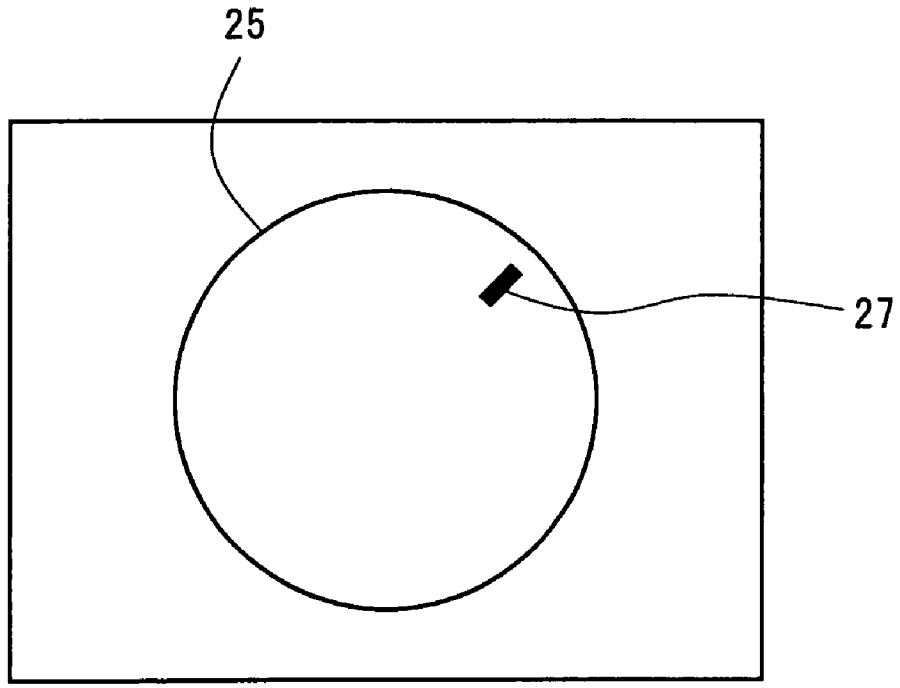

FIG. 3(a) shows an original image photographed by means of the first camera 5. Since the angle of view of the first camera 5 is great, a ball image 25 is photographed to be small in the original image. FIG. 3(b) shows a magnified image obtained by carrying out a magnifying process over the original image data. The magnifying process serves to magnify a rectangular portion (a portion including the ball image 25 in the original image) surrounded by a two-dotted chain line in the original image of FIG. 3(a). The monitor 17 displays the magnified image.

As shown in FIG. 3(b), a black recognition mark 27 is provided on the surface of the golf ball 1. The operator points the recognition mark 27 on the screen of the monitor 17. An input pen or the like is used for the pointing. By the pointing, a read value is read. Since the ball image 25 is magnified and displayed, a read value error is made during the pointing with difficulty. Similarly, the original image photographed by means of the second camera 7 is also subjected to the magnifying process so that a magnified image is displayed on the monitor 17. Then, the recognition mark 27 is pointed.

The rotating angle of the golf ball 1 from the photographing operation of the first camera 5 to that of the second camera 7 is obtained from the read values of two magnified images. The spin rate of the golf ball 1 is calculated from the rotating angle and a time interval from the photographing operation of the first camera 5 to that of the second camera 7. Since the precision in the pointing is high, data on the spin rate thus obtained also have high precision. The launch angle, the flight speed and the like may be measured by the pointing. Also in this case, the data have high precision by the magnifying process.

Figure 4:
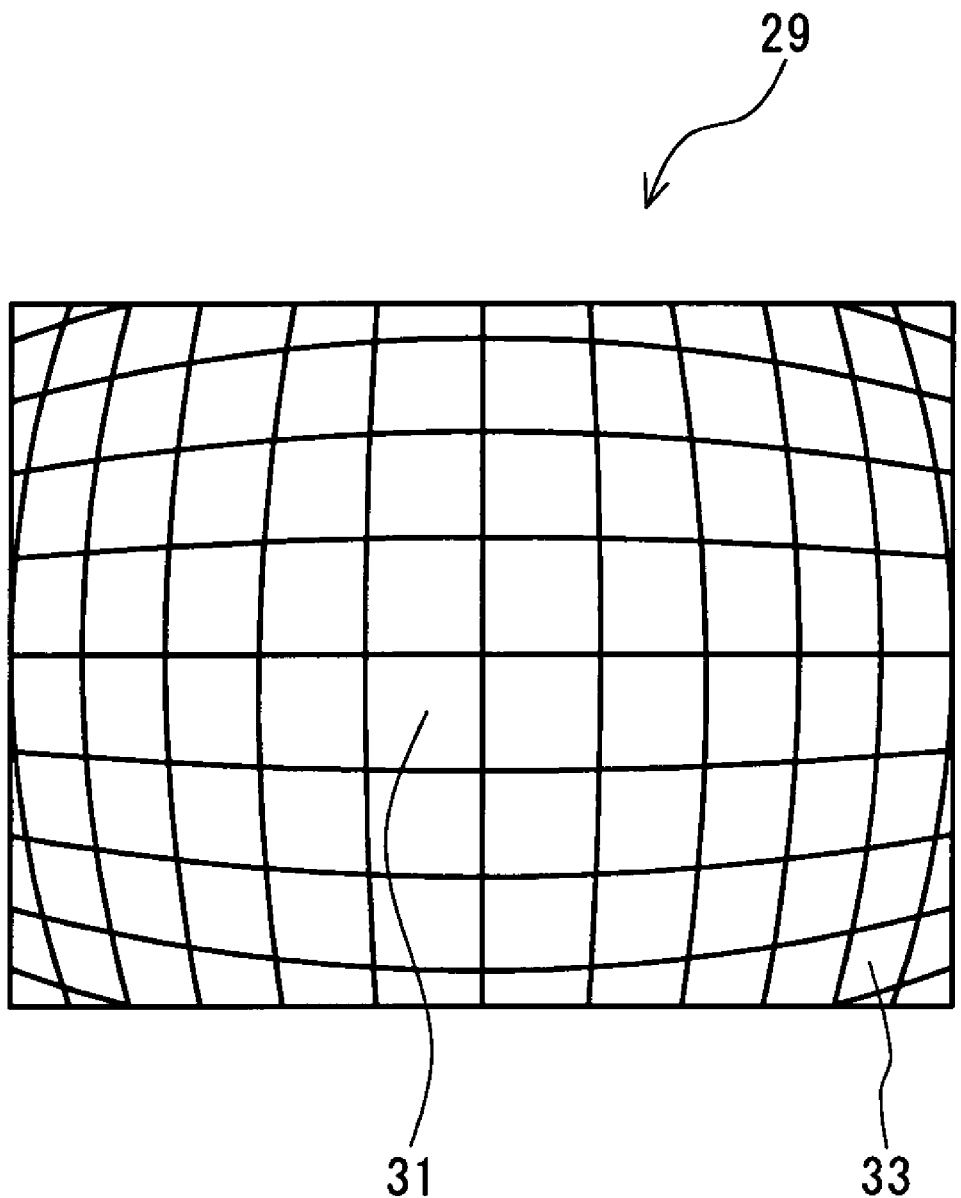
FIG. 4 is a view showing a sample image in which a sample plate having a lattice pattern is photographed.

The original image photographed through the lens generates a distortion. In particular, in the case in which a camera having a great angle of view is used, the distortion is high. FIG. 4 shows a sample image 29 obtained by photographing a sample plate having a lattice pattern through the first camera 5. As is apparent from FIG. 4, a square 31 in the vicinity of the center of the sample image 29 has a contour shape close to a quadrate and the shape of a square 33 in a peripheral portion is changed. As a distance from the center of the sample image 29 is increased, the degree of the distortion becomes higher. Apparently, an error is made between apparent coordinates in the original image data and true coordinates when the golf ball 1 is photographed by means of the first camera 5.

The coordinates (true coordinates) in the sample plate are grasped in advance. A predetermined point is extracted from the sample image 29 (the image shown in FIG. 4) and is subjected to the pointing so that an error range between the apparent coordinates and the true coordinates can be obtained. Based on the error range, a correction ratio is calculated. The correction ratio is not uniform but is varied depending on the distance from the center of the image. In other words, the correction ratio is more increased in a portion closer to the periphery.

Based on the correction ratio, the read value obtained from the original image data is subjected to a distortion correcting process. Consequently, correction data are obtained. Similarly, the read value obtained from the original image data of the second camera 7 is also subjected to the distortion correcting process. Consequently, correction data are obtained. The motion of the golf ball 1 can be measured from the two correction data with high precision.

Figure 5:
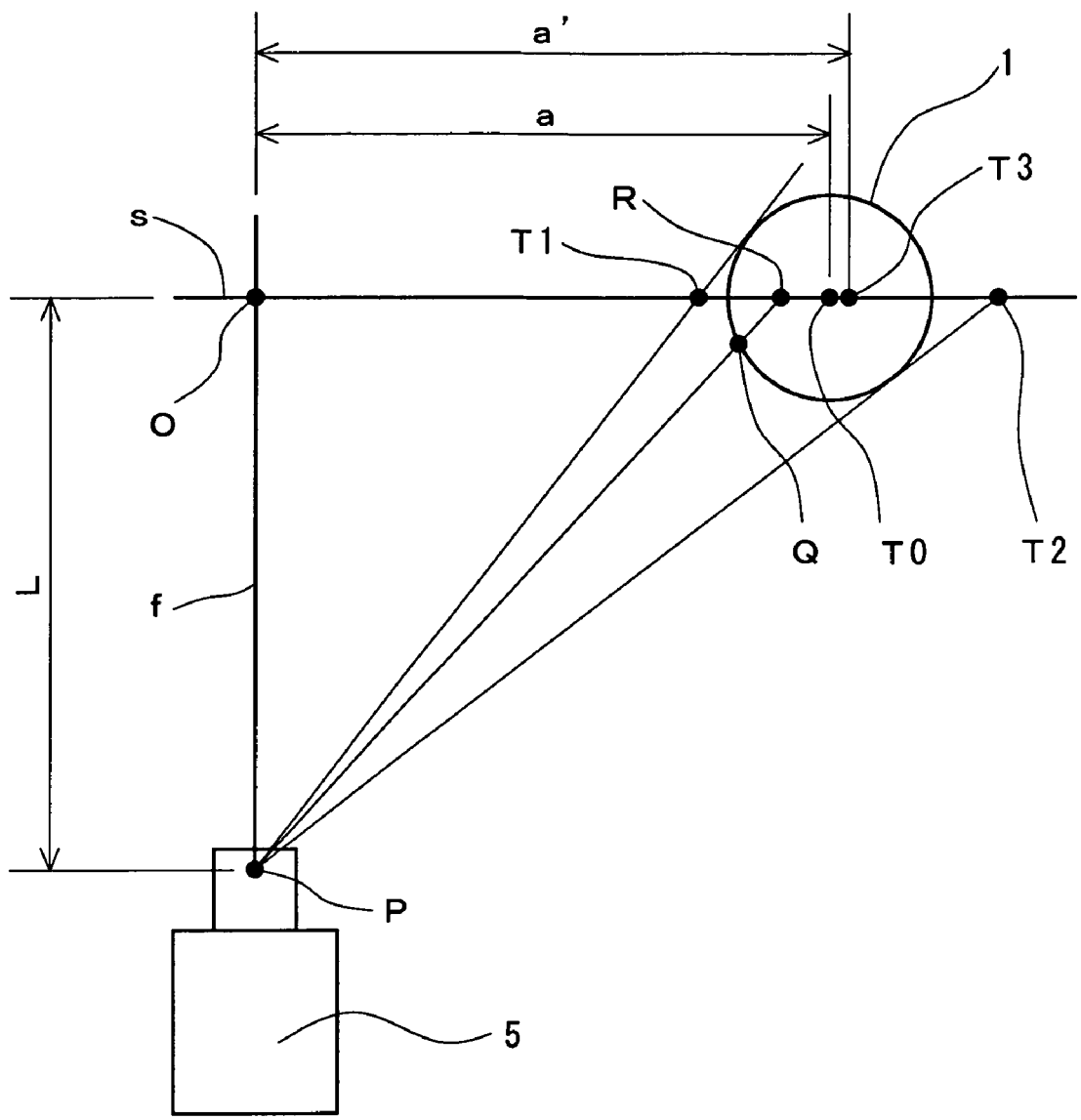
FIG. 5 is a plan view showing the state of photographing carried out by means of a first camera.

FIG. 5 is a plan view showing a state in which the photographing operation of the first camera 5 is carried out. In FIG. 5, a line f indicates a direction of an optical axis of the first camera 5 and a line s indicates a reference plane. The reference plane is extended in an x-y direction. The lines f and s are orthogonal to each other on a reference point O. A point P indicates a focal point of a lens, a point Q indicates a position of the recognition mark 27 provided on the surface of the golf ball 1, and a point R indicates a point obtained by projecting the point Q onto the reference plane. The golf ball 1 flies in almost the x direction (a right direction in FIG. 5) slightly upward. In the original image photographed in the state shown in FIG. 5, the direction of the ball image seen from the first camera 5 is shifted from the direction of the optical axis. The ball image is positioned on the right part of the original image.

A point T0 is the center of the golf ball 1. When the reference point O is an origin, a true x coordinate of the center T0 is "a". In the original image data, one of ends of the golf ball 1 is regarded as a point T1 and the other point is regarded as a point T2. Accordingly, an intermediate point T3 of the points T1 and T2 is regarded as the apparent center of the golf ball 1. When the reference point O is an origin, an x coordinate of the apparent center of the golf ball 1 is regarded as "a'". More specifically, an error is made between the apparent coordinates in the original image data and the true coordinates (assuming that the front part of the golf ball 1 is photographed at infinity). The true x coordinate of "a" can be calculated by the following equation:

$$a = a' \times (L^2 - r^2)/L^2$$

wherein a distance of a segment PO is represented by L and a radius of the golf ball 1 is represented by r.

Since the golf ball 1 is launched obliquely upward, a y coordinate of the center of the golf ball 1 is not zero. A true y coordinate of "b" can be calculated by the following equation:

$$b = b' \times (L^2 - r^2)/L^2$$

wherein an apparent y coordinate in the original image data photographed by means of the first camera 5 is represented by "b'" and an actual y coordinate is represented by "b".

Thus, the read values (a' and b') obtained by the original image data are converted into the correction data (a and b) obtained by photographing the front part of the ball so that true coordinates (a, b, 0) of the center of the golf ball 1 are determined.

A read value obtained from the original image data of the second camera 7 is also subjected to oblique correction. The flight speed, the launch angle and the like of the golf ball 1 are measured with high precision from the correction data of the first camera 5 and the correction data of the second camera 7. In some cases in which the swing track of the golf player 19 is not straight or a misshot is made, the center of the golf ball 1 is shifted from the reference plane. More specifically, a z coordinate of the center of the golf ball 1 is not zero in some cases. In these cases, it is preferable that the correction should be carried out in consideration of a shift in the z direction. A width of the shift in the z direction can be calculated from the size of the ball image in the original image, for example.

In the case in which it is assumed that the point R has coordinates of (u', v', 0) and the center T0 of the golf ball 1 is positioned on the optical axis f, the position of the point Q is set to be a point $Q_0$. Moreover, it is assumed that the coordinates of the point $Q_0$ are $(x_0, y_0, z_0)$ when the center of the golf ball 1 is an origin. Moreover, it is assumed that a length of a segment PQ is set to be "k" times as great as that of a segment PR. The point $Q_0$ is provided on a spherical surface. Therefore, a relationship expressed by the following equation (I) is established.

$$x_0^2 + y_0^2 + z_0^2 = r^2 \quad (I)$$

Moreover, since the coordinates of the point Q are $(x_0+a, y_0+b, z_0)$, the following equations (II) to (IV) are established.

$$x_0 + a = k \times u' \quad (II)$$

$$y_0 + b = k \times v' \quad (III)$$

$$z_0 - L = -(k \times L) \quad (IV)$$

Since the values of "u'" and "v'" are read from the original image data, the value of "k" is calculated based on the equations (I) to (IV). There are two solutions obtained from a quadratic equation for "k". One of the solutions corresponds to a point on this side of the reference plane s (closer to the CCD camera 5) and the other corresponds to an inner point of the reference plane s. A point at which the photographing is to be carried out is provided on this side of the reference planes. Therefore, one of the two solutions which corresponds to the point on this side is employed to be the value of k. The values of $x_0$, $y_0$ and $z_0$ are determined by the value of k and the equations (II) to (IV). Similarly, the values of $x_0$, $y_0$ and $z_0$ are determined by the original image data obtained through the second camera 7. Based on the correction data, a spin rate can be obtained based on vector calculation. Japanese Patent No. 2810320 has disclosed a method for vector calculation as an example. Since the spin rate is obtained from the correction data after the oblique correction is carried out, precision thereof is high.

While the ball motion measuring apparatus has such a structure that a ball image is displayed on the monitor 17 and an operator points a display screen to read a value, the value may be automatically read through an image processing or the like. In case of the automatic reading operation, the monitor 17 may be omitted.

While two original images are photographed by means of two cameras in the ball motion measuring apparatus, three or more cameras may be provided. Moreover, the ball motion measuring apparatus may have such a structure that two or more ball images can be photographed on the original image photographed by means of one camera.

While the magnifying correction, the distortion correction and the oblique correction can be carried out in the ball motion measuring apparatus, the ball motion measuring apparatus may have such a structure that any one or two of them can be performed.

EXPERIMENT 1

Experiment Example A

A CCD camera having a wide-angle lens was prepared for first and second cameras. In the CCD camera, a visual field range in a horizontal direction is 250 mm (a horizontal view angle of 45.24 degrees) when a distance between a focal point P and a reference plane is 300 mm. The positions of both cameras are regulated such that a ball image was photographed in almost the central part of an original image and a golf ball mounted on a tee was hit. The flying golf ball was photographed in a shifted timing by means of two cameras so that two original images were obtained. The original images were displayed on a monitor and a flight speed, a launch angle, a backspin rate and a sidespin rate of the golf ball were calculated through an operation for pointing a recognition mark by an operator. The pointing operation and the calculation were repeated ten times to obtain a variation (4×σ).

Experiment Example B

Original image data obtained in the experiment example A were subjected to a magnifying process having a double magnification ratio so that a magnified image was obtained. Based on the magnified image, the same pointing operation and calculation as those in the experiment example A were repeated ten times. Thus, a variation (4×σ) was obtained.

TABLE 1

Result of Experiment 1

|  | Experiment Example A | Experiment Example B |
|---|---|---|
| Type of lens | Wide angle | Wide angle |
| Magnifying correction ratio | No | × 2 |
| Distortion correction | No | No |
| Oblique correction | No | No |

TABLE 1-continued

Result of Experiment 1

|  | Experiment Example A | Experiment Example B |
|---|---|---|
| Position of ball image in original image |  |  |
| First camera | Center | Center |
| Second camera | Center | Center |
| Variation |  |  |
| Flight speed (m/s) | 0.18 | 0.11 |
| Launch angle (deg.) | 0.31 | 0.15 |
| Backspin rate (rpm) | 180 | 88 |
| Sidespin rate (rpm) | 168 | 84 |

In the Table 1, a measured value has a smaller variation in the experiment example B than that in the experiment example A. Consequently, it is apparent that precision in measurement can be enhanced by the magnifying process.

EXPERIMENT 2

Experiment Example C

The same first and second cameras as those in the experiment example A were prepared. The position of the first camera was regulated such that a ball image can be photographed on the lower left part of an original image and the position of the second camera was regulated such that a ball image can be photographed on the upper right part of the original image. Then, a flying golf ball was photographed by means of the two cameras in a shifted timing. An original image thus obtained was subjected to a double magnifying process. Thus, two magnified images were obtained. The magnified images were displayed on a monitor so that a read value was obtained through an operation for pointing a recognition mark by an operator. A flight speed and a launch angle of the golf ball were calculated from the read value. The pointing operation and the calculation were repeated ten times. Thus, a mean value was obtained.

Experiment Example D

The read value obtained by the pointing operation according to the experiment example C was subjected to oblique correction so that correction data were obtained. A mean value of each of a flight speed and a launch angle was obtained from the correction data.

Experiment Example E

The read value obtained by the pointing operation according to the experiment example C was subjected to distortion correction so that correction data were obtained. A mean value of each of a flight speed and a launch angle was obtained from the correction data.

Experiment Example F

The read value obtained by the pointing operation according to the experiment example C was subjected to oblique correction and distortion correction so that correction data were obtained. A mean value of each of a flight speed and a launch angle was obtained from the correction data.

Reference Example

A first sensor through which a laser beam passes vertically was provided in almost the same position as the position of the ball image of a first camera. Moreover, a second sensor through which a laser beam passes vertically was provided in almost the same position as the position of the ball image of a second camera. A time required for the passage of a golf ball from the first sensor to the second sensor was measured to obtain a flight speed. The flight speed approximates to a true value. Moreover, a line sensor through which a laser beam passes horizontally was provided ahead of the ball image of the second camera in the direction of flight. A launch angle was calculated based on a height of the golf ball passing through the line sensor and a height of the golf ball mounted on a tee. The launch angle approximates to a true value.

TABLE 2

Result of Experiment 2

|  | Ex. C | Ex. D | Ex. E | Ex. F | Ref. Ex. (true value) |
|---|---|---|---|---|---|
| Type of lens | Wide angle | Wide angle | Wide angle | Wide angle |  |
| Magnifying correction ratio | × 2 | × 2 | × 2 | × 2 | Measurement by laser sensor |
| Distortion correction | No | No | Yes | Yes |  |
| Oblique correction | No | Yes | No | Yes |  |
| Position of ball image in original image |  |  |  |  |  |
| First camera | Lower left | Lower left | Lower left | Lower left |  |
| Second camera | Upper right | Upper right | Upper right | Upper right |  |
| Flight speed (m/s) | 56.5 | 56.3 | 58.0 | 57.8 | 57.8 |
| Launch angle (deg.) | 11.2 | 11.2 | 12.1 | 12.1 | 12.1 |

From the Table 2, it is apparent that the measured value approximates to a true value by the distortion correction.

EXPERIMENT 3

Experiment Example G

An XY table was prepared and provided on a reference plane s. Two golf balls were fixed to the XY table. The positional relationship between the two golf balls (the relationship including a backspin) was set to be almost equivalent to that between two ball images in the case in which photographing was carried out twice in a shifted timing from the trajectory of the hit golf ball. On the other hand, the same first and second cameras as those in the experiment example A were prepared. The position of the first camera was regulated such that one of the golf balls can be photographed on the center of an original image and the position of the second camera was regulated such that the other golf ball can be photographed on the left part of the original image. Then, two original images obtained by the respective cameras were subjected to a magnifying process (double). Thus, two magnified images were obtained. The magnified images were displayed on a monitor so that a read value was obtained through an operation for pointing a recognition mark by an operator. The read value was subjected to distortion correction so that correction data were obtained. A backspin rate and a sidespin rate were calculated from the correction data. The pointing operation and the calculation were repeated ten times. Thus, a mean value was obtained.

Experiment Example H

A mean value of each of a backspin rate and a sidespin rate was calculated in the same manner as in the experiment example G except that distortion correction and oblique correction were carried out to obtain correction data.

Experiment Example I

A mean value of each of a backspin rate and a sidespin rate was calculated in the same manner as in the experiment example G except that the other golf ball was moved without a rotation over an XY table and was photographed on the right part of an original image.

Experiment Example J

A mean value of each of a backspin rate and a sidespin rate was calculated in the same manner as in the experiment example I except that distortion correction and oblique correction were carried out to obtain correction data.

Experiment Example K

A CCD camera having a telephoto lens was prepared for first and second cameras. The telephoto lens has a visual field range of 60 mm with a distance between a focal point P and a reference plane of 2300 mm. A golf ball put on an XY table was moved without a rotation and a position was regulated such that a ball image can be photographed on almost the center of an original image. Two original images obtained by the respective cameras were not subjected to correction but displayed on a monitor. The ball images thus displayed were sufficiently large. A backspin rate and a sidespin rate were calculated through an operation for pointing a recognition mark by an operator. The pointing operation and the calculation were repeated ten times so that a mean value was obtained. The backspin rate and sidespin rate thus obtained approximate to true values.

TABLE 3

Result of Experiment 3

|  | Ex. G | Ex. H | Ex. I | Ex. J | Ex. K |
|---|---|---|---|---|---|
| Type of lens | Wide angle | Wide angle | Wide angle | Wide angle | Telephoto |
| Magnifying correction ratio | × 2 | × 2 | × 2 | × 2 | No |
| Distortion correction | Yes | Yes | Yes | Yes | No |
| Oblique correction | No | Yes | No | Yes | No |
| Position of ball image in original image |  |  |  |  |  |
| First camera | Center | Center | Center | Center | Center |
| Second camera | Left | Left | Right | Right | Center |
| Backspin rate (rpm) | 2183 | 2410 | 3243 | 2399 | 2420 |
| Sidespin rate (rpm) | 781 | 103 | −2323 | 126 | 140 |

From the Table 3, it is apparent that the measured value approximates to a true value through oblique correction also in the case in which the wide-angle lens is used.

While the ball motion measuring apparatus according to the present invention has been described by taking the golf ball as an example, the present invention can be used for measuring all balls such as a tennis ball.

What is claimed is:

1. A ball motion measuring apparatus comprising:
a CCD camera for photographing a flying ball to obtain original image data;
a calculating section for carrying out a magnifying process on only a portion of an original image including a ball image, thereby calculating magnified image data; and
a display section for displaying a magnified image based on the magnified image data wherein the magnified image data is used to calculate ball motion,
wherein the calculating section extracts coordinates of an apparent point on the magnified image data, compares the extracted apparent coordinates with corresponding predetermined undistorted coordinates of the ball to thereby calculate an error between the extracted apparent coordinates and the predetermined coordinates, and calculates true coordinates of the points on the magnified image data based on the calculated error, and
wherein the calculated error increases in accordance with a distance from a center of the magnified image data.

2. The ball motion measuring apparatus according to claim 1, wherein the CCD camera has a horizontal view angle of 10 degrees or more.

3. A ball motion measuring apparatus comprising:
a CCD camera for photographing a flying ball to obtain original image data; and
a calculating section for correcting a coordinate error of only a ball image in the original image made by a distortion of an original image which is caused by a lens of the CCD camera, thereby calculating correction data, said correction data being used to calculate true coordinates of the ball image,
wherein the coordinate error is corrected based on a correction ratio between a coordinate of a position on an undistorted image of the ball and a corresponding position on the ball in the distorted original image, and
wherein the correction ratio increases in accordance with a distance from a center of the distorted original image.

4. The ball motion measuring apparatus according to claim 3, wherein the COD camera has a horizontal view angle of 10 degrees or more.

5. A ball motion measuring apparatus comprising:
a CCD camera for photographing a flying ball to obtain original image data; and
a calculating section for correcting a coordinate error of only a ball image in the original image made by a shift of a direction of the ball image from a direction of an optical axis of the CCD camera, thereby calculating correction data, said correction data being used to calculate true coordinates of the ball images,
wherein the coordinate error is corrected based on a correction ratio between a coordinate of a position on an undistorted image of the ball and a corresponding position on the ball in a distorted image of the ball caused by the shift of the direction of the ball image, and
wherein the correction ratio increases in accordance with a distance from a center of the original image data.

6. The ball motion measuring apparatus according to claim 5, wherein the correction of the coordinate error serves to convert data obtained from an original image into data obtained by photographing a front part of the ball at infinity.

7. The ball motion measuring apparatus according to claim 5, wherein the CCD camera has a horizontal view angle of 10 degrees or more.

8. The ball motion measuring apparatus according to claim 1, wherein the calculated true coordinates of the points on the magnified image data are used to calculate true coordinates of the ball image.

* * * * *